United States Patent
Boughton et al.

(10) Patent No.: US 9,376,338 B2
(45) Date of Patent: Jun. 28, 2016

(54) METHODS AND APPARATUSES FOR FORMING OPTICAL PREFORMS FROM GLASS SOOT

(71) Applicant: Corning Incorporated, Corning, NY (US)

(72) Inventors: Daniel Robert Boughton, Naples, NY (US); Christopher Scott Thomas, Horseheads, NY (US); Ji Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/520,799

(22) Filed: Oct. 22, 2014

(65) Prior Publication Data

US 2015/0128649 A1    May 14, 2015

Related U.S. Application Data

(60) Provisional application No. 61/904,085, filed on Nov. 14, 2013.

(51) Int. Cl.
  *C03B 37/014* (2006.01)
  *C03B 37/012* (2006.01)
  *C03B 19/06* (2006.01)

(52) U.S. Cl.
  CPC .............. *C03B 37/014* (2013.01); *C03B 19/066* (2013.01); *C03B 37/01205* (2013.01); *C03B 37/01282* (2013.01); *C03B 37/01285* (2013.01)

(58) Field of Classification Search
  None
  See application file for complete search history.

(56) References Cited

U.S. PATENT DOCUMENTS

| 4,798,694 | A |  | 1/1989 | Sugata et al. |
| 4,885,018 | A |  | 12/1989 | Bachmann et al. |
| 5,352,259 | A | * | 10/1994 | Oku ................... C03B 37/01282 65/144 |
| 8,904,828 | B2 | * | 12/2014 | Dawes .............. C03B 37/01282 264/1.24 |
| 2010/0071421 | A1 | * | 3/2010 | Dawes .............. C03B 37/01282 65/427 |
| 2010/0107700 | A1 | * | 5/2010 | Dawes .............. C03B 37/01282 65/404 |
| 2011/0132038 | A1 | * | 6/2011 | Dawes .............. C03B 37/01282 65/408 |
| 2012/0047959 | A1 |  | 3/2012 | Allen et al. |

FOREIGN PATENT DOCUMENTS

| EP | 0553868 | 8/1993 |
| JP | 1987036036 | 2/1987 |
| JP | 1992124043 | 4/1992 |
| JP | 1993294659 | 11/1993 |

OTHER PUBLICATIONS

Dorn R: " Mechanically Shaped Preforms foroptical Fiber Production", Electrical Communication, Harlow, Essex, vol. 59, No. 4, (Jan. 1, 1985), pp. 396-400.

* cited by examiner

*Primary Examiner* — Mark Halpern
(74) *Attorney, Agent, or Firm* — Kevin L. Bray

(57) ABSTRACT

Methods and apparatuses for forming optical preforms from silica glass soot are disclosed. According to one embodiment, a method for forming an optical preform may include loading silica glass soot in a mold cavity of a mold body. The mold body may be rotated at a rotational speed sufficient to force the silica glass soot towards an inner wall of the mold body. Thereafter the silica glass soot is compressed in an inward radial direction as the mold body is rotated to form a soot compact layer.

14 Claims, 6 Drawing Sheets ically depicts a soot pressing apparatus for
METHODS AND APPARATUSES FOR FORMING OPTICAL PREFORMS FROM GLASS SOOT This application claims the benefit of priority under 35 U.S.C. §119 of U.S. Provisional Application Ser. No. 61/904,085 filed on Nov. 14, 2013, the content of which is relied upon and incorporated herein by reference in its entirety.

BACKGROUND

1. Field

The present specification generally relates to the manufacture of optical preforms, such as optical fiber preforms and, more specifically, to methods and apparatuses for forming optical preforms from glass soot.

2. Technical Background

Conventionally, the outer cladding portion of an optical fiber preform may be formed from an outside vapor deposition (OVD) process in which silica glass is deposited on a glass core blank, for example, through the pyrolysis of octamethyltetrasiloxane. The OVD process is a highly optimized, high yield manufacturing process. However, the formation of the cladding layer is often the rate limiting step in maximizing optical fiber output. Further, it is estimated that as little as 50% of the pyrolysis product of the octamethyltetrasiloxane feedstock is deposited on the glass core blanks during deposition of the outer cladding portion of the optical fiber preform. The remaining pyrolysis product of the octamethyltetrasiloxane feedstock is collected in a baghouse as silica glass soot. The collected silica glass soot has a relatively high purity, but still has contaminants which prevent it from being used to produce high quality claddings of optical fiber preforms. Attempts have been made to use a soot pressing process with this waste silica by employing a strenuous chemistry process to remove the impurities with mixed results. As a consequence, high purity soot generation processes have been developed on an industrial and lab scale permitting the soot characteristics (such as particle distribution and the index of refraction by the addition of dopants) to be altered at will.

Prior techniques for forming cladding layers of an optical preform from silica glass soot, such as vertical pressing, are only suitable for forming a single cladding layer. As such, these techniques cannot be utilized to form preforms that have a complex refractive index profile through the radial cross section of the preform. Specifically, these techniques cannot be used to reliably construct an optical preform which includes multiple layers of silica glass soot where each layer is formed from silica glass soot with a different composition and/or morphology.

Accordingly, a need exists for alternative methods and apparatuses for forming an optical preform, such as an optical fiber preform, from silica glass soot.

SUMMARY

According to one embodiment, a method for forming an optical preform may include loading silica glass soot in a mold cavity of a mold body. The mold body may be rotated at a rotational speed sufficient to force the silica glass soot towards an inner wall of the mold body. Thereafter the silica glass soot is compressed in an inward radial direction as the mold body is rotated to form a soot compact layer.

In another embodiment, a method for forming an optical preform may include loading a first amount of silica glass soot in a mold cavity of a mold body. The mold body may be rotated at a rotational speed sufficient to force the first amount of silica glass soot towards an inner wall of the mold body. The first amount of silica glass soot may be compressed in an inward radial direction as the mold body is rotated to form a first soot compact layer. A second amount of silica glass soot may be loaded in the mold cavity of the mold body around the first soot compact layer. The mold body may be rotated at a rotational speed sufficient to force the second amount of silica glass towards the inner wall of the mold body. The second amount of silica glass soot may be compressed in an inward radial direction as the mold body is rotated to form a second soot compact layer around the first soot compact layer.

In yet another embodiment, an apparatus for forming an optical preform may include a mold body comprising a mold cavity and an elastically deformable bladder. The elastically deformable bladder may be disposed within and lines the mold cavity adjacent to an inner wall of the mold body. A fluid source may be coupled to the mold cavity between the inner wall of the mold body and the elastically deformable bladder. The fluid source may supply a compressing fluid to the mold cavity to compress the elastically deformable bladder in a radially inward direction. A rotary device may be attached to at least one of a first end of the mold body and a second end of the mold body, the rotary device rotating the mold body about a rotational axis of the mold body.

Additional features and advantages of the methods described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
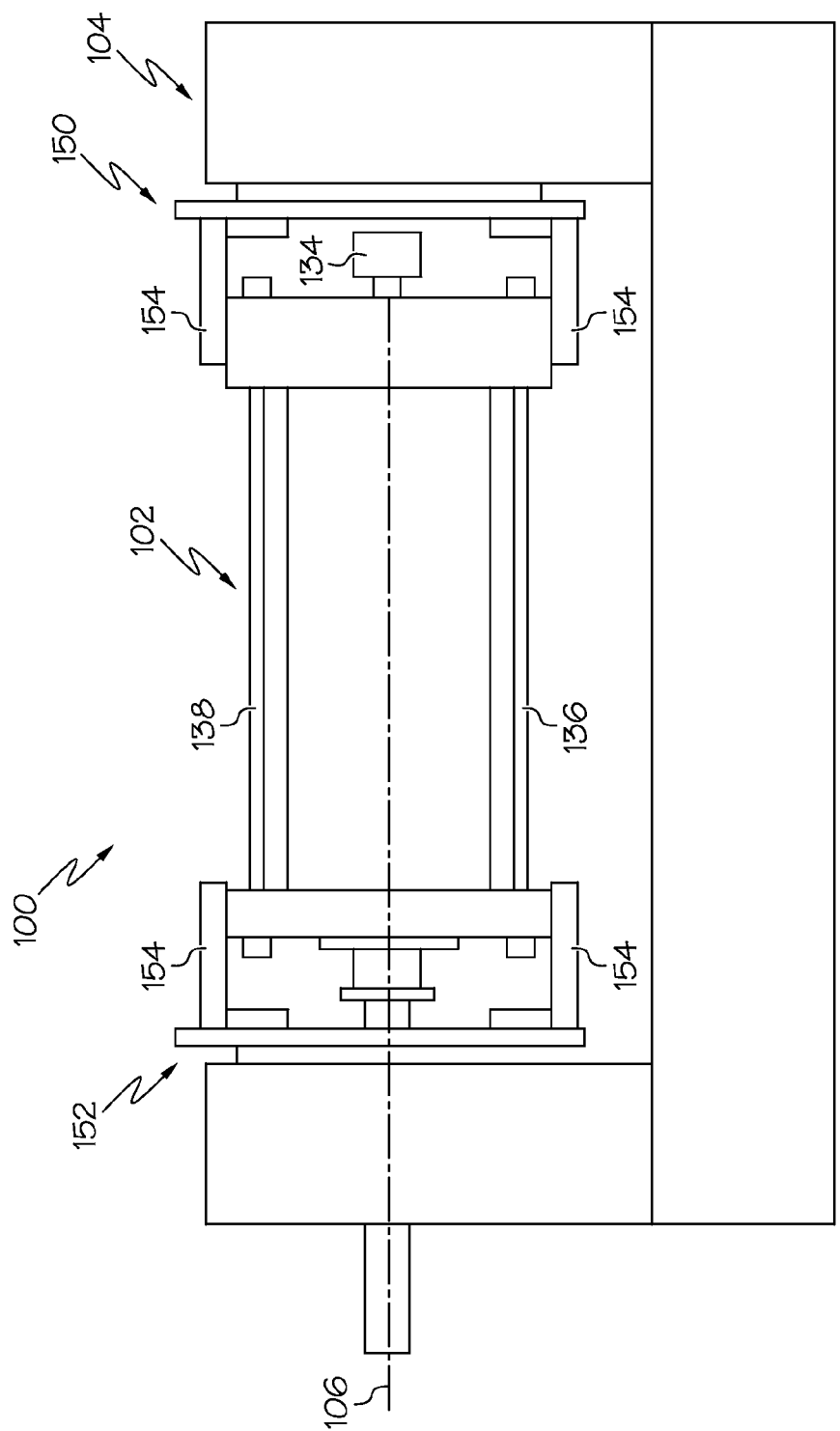
FIG. 1 schematically depicts a soot pressing apparatus for forming an optical preform from silica glass soot according to one or more embodiments shown and described herein.

Reference will now be made in detail to embodiments of methods and apparatuses for forming optical preforms from silica glass soot, examples of which are illustrated in the accompanying drawings. Whenever possible, the same reference numerals will be used throughout the drawings to refer to the same or like parts. In one embodiment, a method for forming an optical preform may include loading silica glass soot in a mold cavity of a mold body. The mold body may be rotated at a rotational speed sufficient to force the silica glass soot towards an inner wall of the mold body. Thereafter the silica glass soot is compressed in an inward radial direction as the mold body is rotated to form a soot compact layer. Various embodiments of methods and apparatuses for forming optical preforms from silica glass soot will be described in more detail herein with specific reference to the appended figures.

The following terminology will be used herein to described the soot preforms and optical fiber preforms formed therefrom:

The term "refractive index profile," as used herein, is the relationship between the refractive index and the radius of the preform compact assembly and/or optical preform.

The term "up-dopant," as used herein, refers to a dopant which raises the refractive index of silica glass relative to pure, undoped $SiO_2$. The term "down-dopant," as used herein, is a dopant which lowers the refractive index of silica glass relative to pure, undoped $SiO_2$.

The term "substantially free," as used herein with reference to silica glass soot, means that the silica glass soot contains less than 0.1 wt. % of a specified material as either a contaminant or tramp constituent (i.e., the material is not intentionally added to the silica glass soot).

Referring now to FIG. 1, a soot pressing apparatus 100 for forming an optical preform from silica glass soot is schematically depicted. The soot pressing apparatus 100 includes a mold 102 which is rotationally coupled to a rotary device 104 for rotating the mold 102 about a long axis 106 of the mold 102 (i.e., the axis of rotation of mold 102). The rotary device 104 may be any suitable device for imparting rotation to the mold 102. For example, in the embodiment of the soot pressing apparatus 100 depicted in FIG. 1, the rotary device 104 is a lathe. In an alternative embodiment (not shown), the rotary device may be a roller table comprising one or more actively driven rollers which engage with the mold and rotate the mold about the long axis of the mold. However, it should be understood that other devices suitable for imparting rotation to the mold may be used including, without limitation, purpose-built devices.

Figure 2:
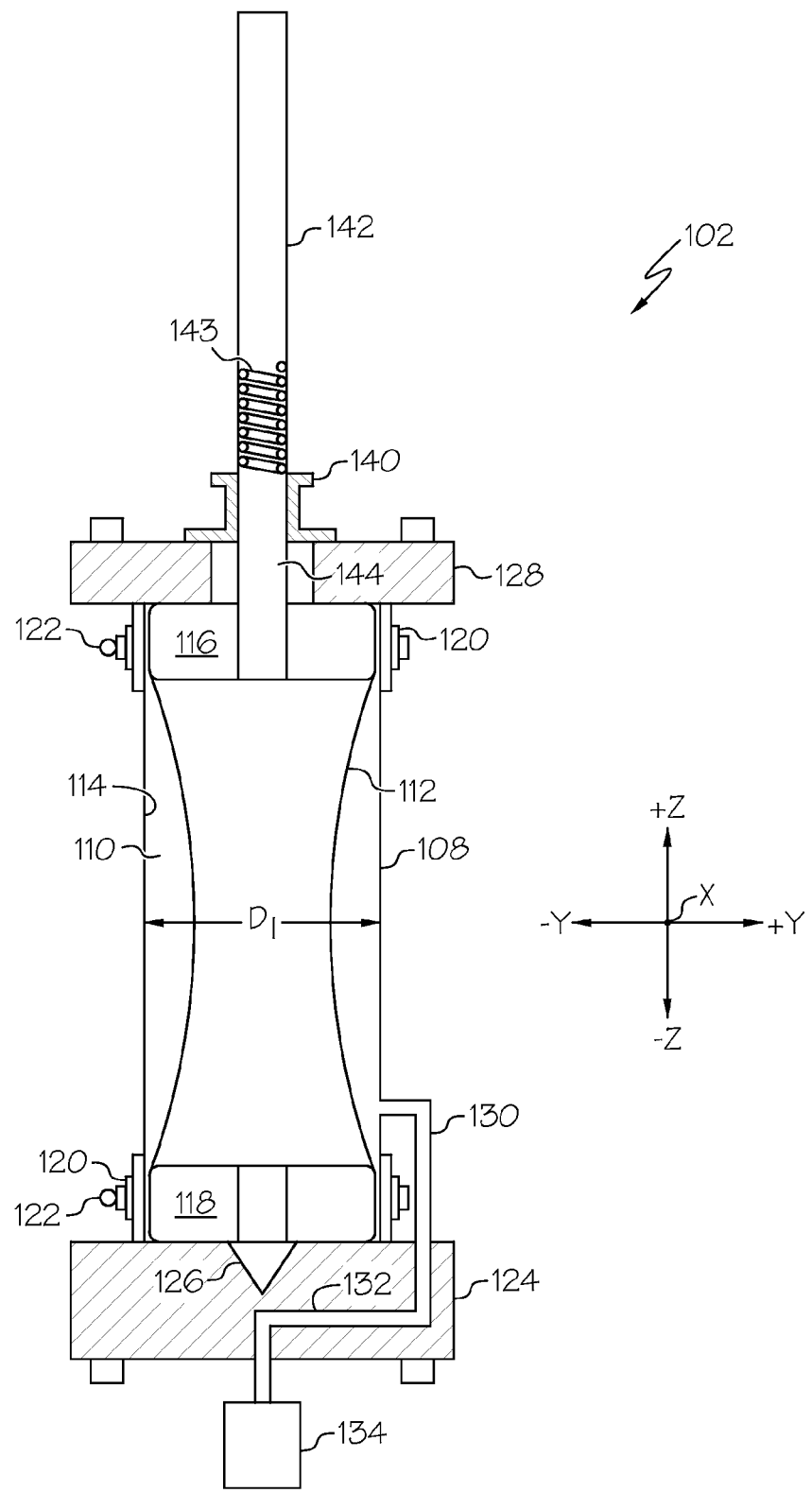
FIG. 2 schematically depicts a cross section of the mold of the soot pressing apparatus of FIG. 1, according one or more embodiments shown and described herein.

Referring now to FIGS. 1 and 2, FIG. 2 schematically depicts a cross section of the mold 102 of the soot pressing apparatus 100 of FIG. 1. The mold 102 generally comprises a mold body 108 having a mold cavity 110 formed therein. The mold cavity 110 is circular in radial cross section (i.e., the section through the mold in the +/−y-direction or the +/−x-direction of the coordinate axes depicted in FIG. 2). Accordingly, it should be understood that the mold cavity is generally cylindrical. The mold body 108 may be formed from aluminum alloys, steel, carbon fiber, polymeric material or any other suitable material. In the embodiment shown in FIG. 2, the mold body is formed from an aluminum alloy.

The mold 102 further comprises an elastically deformable bladder 112 positioned within the mold cavity 110 adjacent to an inner wall 114 of the mold body 108. The elastically deformable bladder 112 is formed from an elastically deformable and recoverable material such as latex rubber, silicone, neoprene, cast urethane or the like. In the embodiments described herein, the elastically deformable bladder 112 is formed from latex rubber having a thickness from about 15 thousandths of an inch to about 30 thousandths of an inch (~0.3 mm to about 0.8 mm). However, it should be understood that other thicknesses for the elastically deformable bladder 112 are contemplated. It should also be understood that other materials for the elastically deformable bladder 112 are also contemplated.

The elastically deformable bladder 112 is generally in the shape of a cylindrical sleeve which is open at both ends. In embodiments, the diameter of the elastically deformable bladder 112 is less than the inner diameter $D_I$ of the mold cavity 110. The elastically deformable bladder 112 is positioned in the mold cavity 110 and the ends of the bladder are stretched and folded over the ends of the mold body 108. The folded ends are secured in place on the outer diameter of the mold body 108 with elastic bands 120 around which hose clamps 122 are positioned. When in a relaxed state, the elastically deformable bladder 112 is at least partially spaced apart from the inner wall 114 of the mold cavity 110, as depicted in FIG. 2.

The mold 102 further comprises a lower end cap 124 and an upper end cap 128 affixed to opposite ends of the mold body 108 (i.e., the first end and the second end of the mold body 108 in the +/−z-direction of the coordinate axes of FIG. 2) such that the lower end cap 124 and the upper end cap 128 are opposed to one another in the direction of the long axis 106 of the mold body 108. The lower end cap 124 and the upper end cap 128 may be formed from aluminum alloys, steel, carbon fiber, polymeric material or any other suitable material. In the embodiments described herein, the lower end cap 124 and the upper end cap 128 are formed from the same material as the mold body 108 (i.e., an aluminum alloy). However, it should be understood that, in other embodiments, the lower end cap 124 and the upper end cap 128 may be formed from material which is different than that of the mold body 108. In the embodiments described herein, the lower end cap 124 and the upper end cap 128 have diameters which are greater than the outer diameter of the mold body 108 such that both the upper end cap 128 and the lower end cap 124 extend beyond the outer diameter of the mold body and form flanges in the +/−y-direction and the +/−x-direction.

Still referring to FIG. 2, in embodiments where the soot pressing apparatus 100 is used to form an optical fiber preform comprising a soot compact pressed around a central glass core blank, at least one of the lower end cap 124 and the upper end cap 128 may include a blind notch 126 for receiving an end of a glass core blank when the glass core blank is positioned within the mold cavity 110. In the embodiment of the mold 102 depicted in FIG. 2, the blind notch 126 is formed in the lower end cap 124. In this embodiment, the blind notch 126 is a v-shaped notch formed in the lower end cap 124. However, it should be understood that other configurations and geometries of the blind notch are contemplated. The blind notch 126 is formed in the lower end cap 124 such that the long axis of the glass core blank can be aligned with the long axis of the mold 102 when the glass core blank is engaged with the blind notch 126.

Similarly, in embodiments where the soot pressing apparatus 100 is used to form an optical fiber preform comprising a soot compact pressed around a central glass core blank, at least one of the lower end cap 124 and the upper end cap 128 may include an aperture 144 for receiving an end of a glass core blank when the glass core blank is positioned within the mold cavity 110. In the embodiment of the mold 102 depicted in FIG. 2, the aperture 144 is formed in the upper end cap 128. The aperture 144 is formed in the upper end cap 128 such that the long-axis of the glass core blank is substantially co-linear with the long axis of the mold 102 when the glass core blank is engaged with the blind notch 126 and positioned in the aperture 144.

In embodiments, the lower end cap 124 and the upper end cap 128 may be secured to the mold body 108 with threaded rods 136, 138 (FIG. 1) which extend through the end caps 124, 128 and are secured with threaded fasteners, such as lock nuts or the like. In embodiments, the lower end cap 124 and the upper end cap 128 may be formed with a mating groove (not shown) in which the ends of the mold body 108 are positioned to facilitate centering the end caps 124, 128 on the mold body 108.

The mold 102 may further comprise an adapter 140 (QF adapter) aligned with the aperture 144 formed in one of the lower end cap 124 or the upper end cap 128. The adapter 140 facilitates coupling an adapter tube 142 (such as a QF40 tube) to the aperture 144. The adapter tube 142 may be used to assist in centering and stabilizing a glass core blank 170 in the mold cavity 110 during a soot pressing operation. To further assist in centering and stabilizing a glass core blank in the mold cavity 110, one or more compression springs 143 may be disposed in the interior of the adapter tube 142. The upper end of the springs may be held in place with a stop (not shown), such as a QF40-to-Swagelok® adapter. The lower end of the springs may seat on a washer (not shown) through which the glass core blank 170 is inserted. The adapter tube 142 may optionally be used to draw a vacuum on the mold cavity 110 during a soot pressing operation, thereby evacuating air from the mold cavity as silica glass soot is compressed, as will be described in further detail herein.

Still referring to FIG. 2, the mold 102 may further comprise a pair of stopper cushions 116, 118 which are positioned in the mold cavity 110 at opposite ends of the mold body 108. In embodiments where the soot pressing apparatus 100 is used to form a soot compact layer pressed around a central glass core blank, the stopper cushions 116, 118 may have an annular shape with a central annulus for receiving a glass core blank. The stopper cushions 116, 118 are formed from a compressible, open-cell foam material, such as polyurethane foam or a similar material. The stopper cushions 116, 118 protect and cushion the elastically deformable bladder 112 and the preform compact layer formed in the mold cavity 110. The open-cell structure of the stopper cushions also allows air to escape from the interior of the mold cavity 110, either passively or actively (such as when a vacuum is drawn on the mold cavity 110), as the elastically deformable bladder is compressed radially inward, as will be described in further detail herein.

The mold 102 may further include a fitting 130 coupled through the mold body 108 such that fluid, such as air or the like, may be pumped into or evacuated from the mold cavity between the inner wall 114 of the mold body 108 and the elastically deformable bladder 112. In the embodiment of the mold 102 depicted in FIG. 2, the fitting 130 is coupled through the sidewall of the mold body 108 and fluidly coupled to a supply channel 132 formed in the lower end cap 124. The inlet of the supply channel 132 is positioned in the lower end cap 124 on the long axis of the mold 102 and may be coupled to a rotary union 134. The orientation of the inlet of the supply channel 132 on the long axis of the mold 102 and the use of a rotary union 134 permit fluid to be pumped into and/or evacuated from the mold cavity 110 as the mold 102 is rotated about its long axis 106.

While embodiments of the soot pressing apparatus 100 described herein are constructed to accommodate a glass core blank in order to form one or more soot compact layers around the glass core blank, it should be understood that alternative constructions are possible and contemplated. For example, the soot pressing apparatus described herein may also be constructed to form an optical preform without a central core blank. In these embodiments (not shown) the lower end cap 124 may be formed without a blind notch. Similarly, the stopper cushions 116, 118 may be formed without a central annulus. Forming an optical preform without a central core blank may also eliminate the need for the at least one compression spring 143 in the adapter tube 142.

Figure 3:
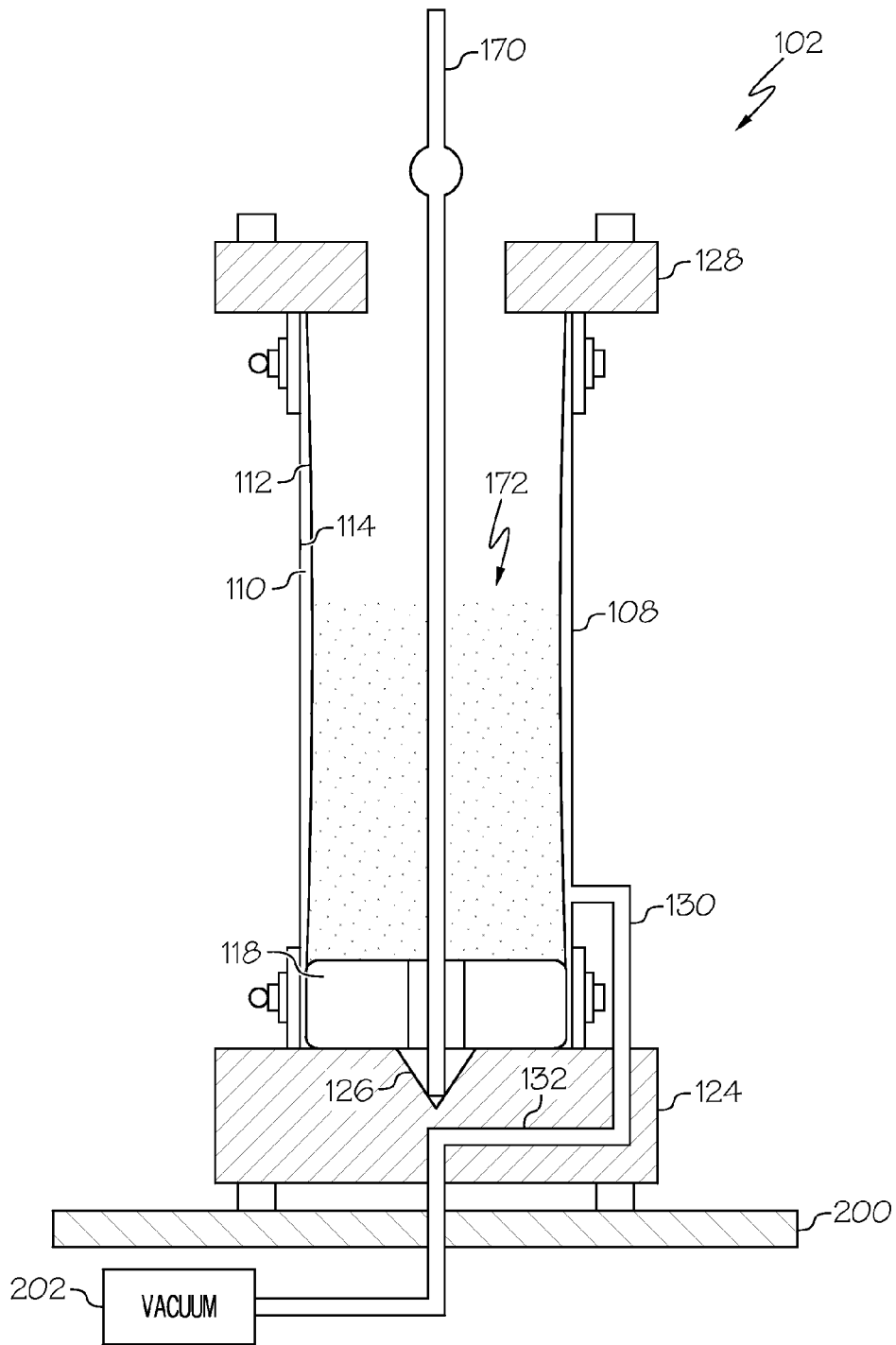
FIG. 3 schematically depicts a cross section of the mold of the soot pressing apparatus as the mold body is being loaded with silica glass soot.

Referring now to FIG. 3, to form an optical fiber preform with the soot pressing apparatus, a glass core blank 170 is positioned in the mold cavity 110 of the mold body 108 such that an end of the glass core blank 170 is engaged with the blind notch 126. A first amount of silica glass soot 172 is then loaded into the mold cavity 110 through the upper end cap 128. This first amount of silica glass soot 172, which ultimately forms a first preform cladding layer around the glass core blank 170, may have a first composition and/or a first morphology. Regarding the composition of the silica glass soot, the soot may comprise silica glass which is substantially free from any dopant materials such as up-dopants or down-dopants. Alternatively, the silica glass soot may comprise silica glass soot with one or more dopants which either increase and/or decrease the index of refraction of silica glass. For example, suitable up-dopants for increasing the index of refraction of the silica glass soot may include, without limitation, $GeO_2$, $Al_2O_3$, $P_2O_5$, $TiO_2$, $ZrO_2$, $Nb_2O_5$, $Ta_2O_5$, Cl and/or combinations thereof. Suitable down-dopants for decreasing the index of refraction of the silica glass soot may include, without limitation, F, $B_2O_3$, $SiF_4$, $CF_4$, $C_2F_6$, and/or combinations thereof. Silica glass soot having the appropriate dopant(s) (or lack thereof) may be selected to achieve a specific refractive index profile in the optical fiber preform resulting from the soot compact assembly formed from the soot pressing apparatus 100. Regarding the morphology of the silica glass soot, silica glass soot having a desired morphology (i.e., the size and shape of the individual particles, particle size distribution, etc.) may be added to achieve a preform cladding layer having a desired porosity, tortuosity, density, surface area, or the like following the pressing operation.

Vibratory energy may be applied to the mold body 108 to aid in settling the soot in the mold cavity 110 and to remove any pockets of air that are trapped in the silica glass soot. This vibratory energy may be applied as the silica glass soot is loaded into the mold cavity 110 and/or after the silica glass soot is loaded into the mold cavity. In one embodiment, the vibratory energy may be applied to the mold body 108 by positioning the mold body on a vibrating plate 200, as depicted in FIG. 3. Alternatively, the vibratory energy may be coupled into the mold body 108 using an apparatus as described in U.S. patent application Ser. No. 12/603,960 filed Oct. 22, 2009 entitled "Methods for Forming Cladding Portions of Optical Fiber Preform Assemblies" and assigned to Corning Inc.

As the silica glass soot 172 is loaded into the mold cavity 110, a vacuum may be optionally drawn on the mold cavity 110 through the fitting 130 using vacuum pump 202. Drawing a vacuum on the mold cavity through the fitting 130 evacuates the air between the elastically deformable bladder 112 and the inner wall 114 of the mold cavity 110 and causes the elastically deformable bladder 112 to elastically expand radially outward, towards the inner wall 114 of the mold cavity 110. The outward expansion of the elastically deformable bladder 112 allows for a greater volume of soot to be loaded into the mold cavity 110.

Figure 4:
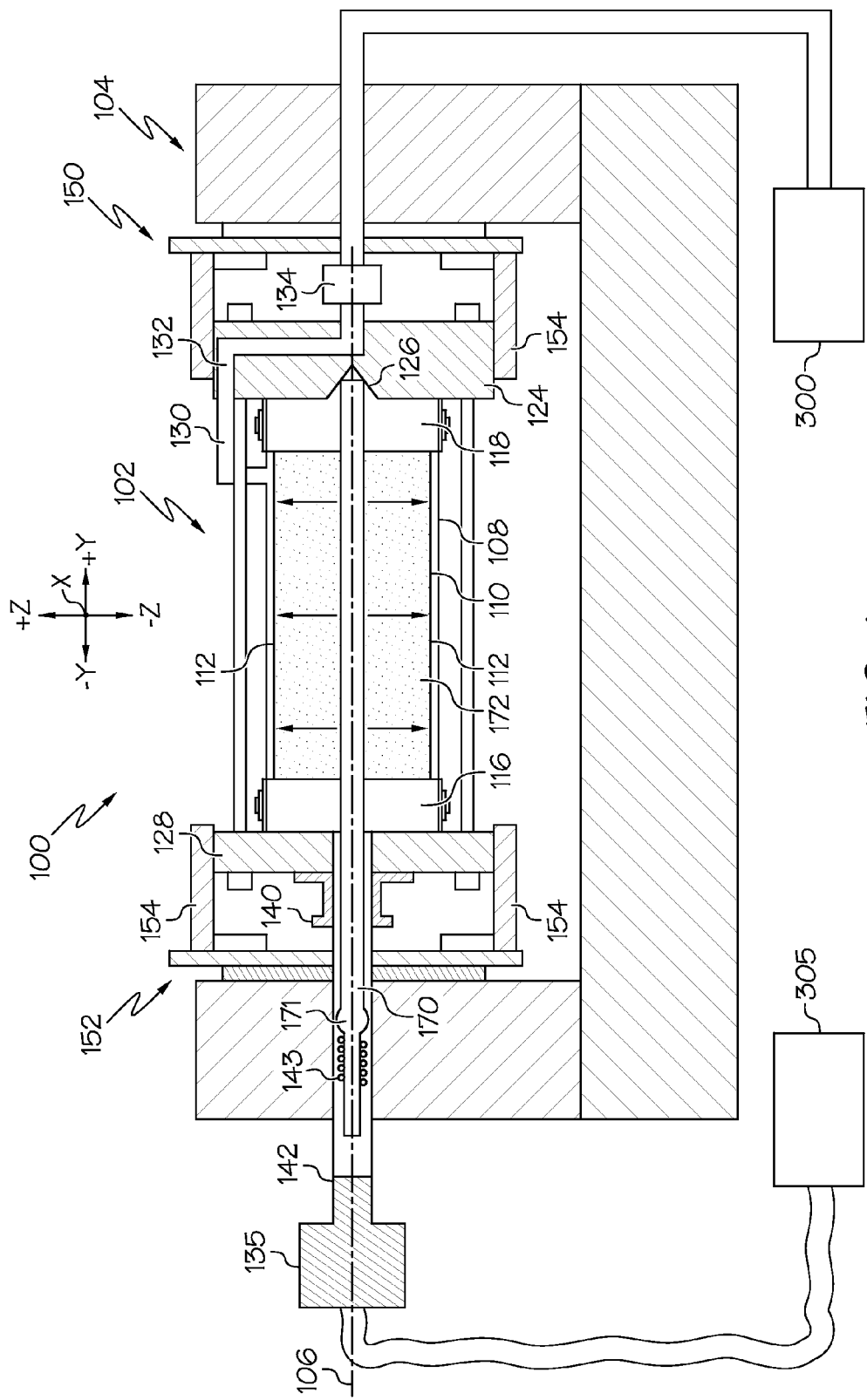
FIG. 4 schematically depicts a cross section of the soot pressing apparatus of FIG. 1 with silica glass soot in the mold cavity as the mold is being rotated.

Referring now to FIG. 4, once the silica glass soot 172 is loaded into the elastically deformable bladder 112 of the mold cavity 110, the upper stopper cushion (i.e., stopper cushion 116) is positioned in the mold cavity 110 around the glass core blank 170 and over the silica glass soot 172. Thereafter, the adapter 140 is positioned around the glass core blank 170 and affixed to the upper end cap 128 using threaded fasteners, such as bolts or the like. At least one compression spring 143 is then disposed around the glass core blank 170 adjacent to ball 171 formed on the glass core blank 170. The adapter tube 142 is then positioned around the glass core blank 170 and the at least one compression spring 143 and inserted into the adapter 140 where it is secured in place. As the adapter tube 142 is inserted into the adapter 140, the adapter tube 142 engages with the at least one compression spring 143, compressing the at least one compression spring 143 and both centering and stabilizing the glass core blank 170 in the mold body 108. The interaction between the glass core blank 170, the at least one compression spring 143, and the adapter tube 142 prevents the glass core blank 170 from wobbling in the mold cavity 110 as the mold 102 is subsequently rotated.

In some embodiments described herein, loading the mold 102 with silica glass soot and securing the glass core blank 170 in the mold 102 is performed while the mold 102 is substantially vertically oriented (i.e., the long axis of the mold is substantially parallel with the +/−z-direction of the coordinate axes depicted in FIG. 2.

Once the mold 102 is loaded with silica glass soot 172 and the glass core blank 170 is secured and stabilized within the mold cavity 110 of the mold body 108, the mold 102 is coupled to the rotary device 104. In embodiments where the rotary device 104 is a lathe, as depicted in FIG. 4, the mold 102 is clamped into the chucks 150, 152 of the lathe to secure the mold 102 for rotation by the lathe. In the embodiments described herein, the mold 102 is clamped in the chucks 150, 152 with lathe dawgs 154 such that mold 102 can be rotated about the long axis 106 of the mold 102. In addition, the mold 102 is clamped in the chucks 150, 152 such that the long axis 106 of the mold is substantially horizontal (i.e., parallel with the +/−y-direction of the coordinate axes depicted in FIG. 4). This allows the silica glass soot to be uniformly distributed along the length of the mold 102 (i.e., the dimension in the +/−y-direction). Thereafter, the rotary union 134 is connected to the fitting 130 through the lower end cap 124. The rotary union 134 is then coupled to a fluid source 300 which, in this embodiment, is a compressor. Alternatively, the fluid source may be a compressed gas cylinder or a similar source of compressed fluid. Optionally, a second rotary union 135 may be coupled to the adapter tube 142 to facilitate coupling a vacuum pump 305 to the adapter tube to evacuate air from the interior of the mold cavity 110, specifically the interior of the elastically deformable bladder 112, as the mold 102 is rotated with the rotary device.

Still referring to FIG. 4, the mold 102 is then rotated about the long axis 106 with the rotary device 104 at a rotational speed sufficient to force the silica glass soot 172 radially outwards, towards the inner wall 114 of the mold body, as depicted in FIG. 4. This force imparted to the silica glass soot 172 by the rotation of the mold 102 causes the silica glass soot to become evenly distributed over the interior of the elastically deformable bladder 112, thereby forming a layer of soot with a substantially uniform thickness. In order to achieve this even distribution of soot over the interior of the elastically deformable bladder 112, the mold 102 is rotated at speed from greater than or equal to about 50 RPM to less than or equal to about 500 RPM. For example, in one embodiment, the mold 102 may be rotated at a speed from greater than or equal to about 100 RPM to less than or equal to about 400 RPM. In another embodiment, the mold 102 may be rotated at a speed from greater than or equal to about 75 RPM to less than or equal to about 115 RPM.

Figure 5:
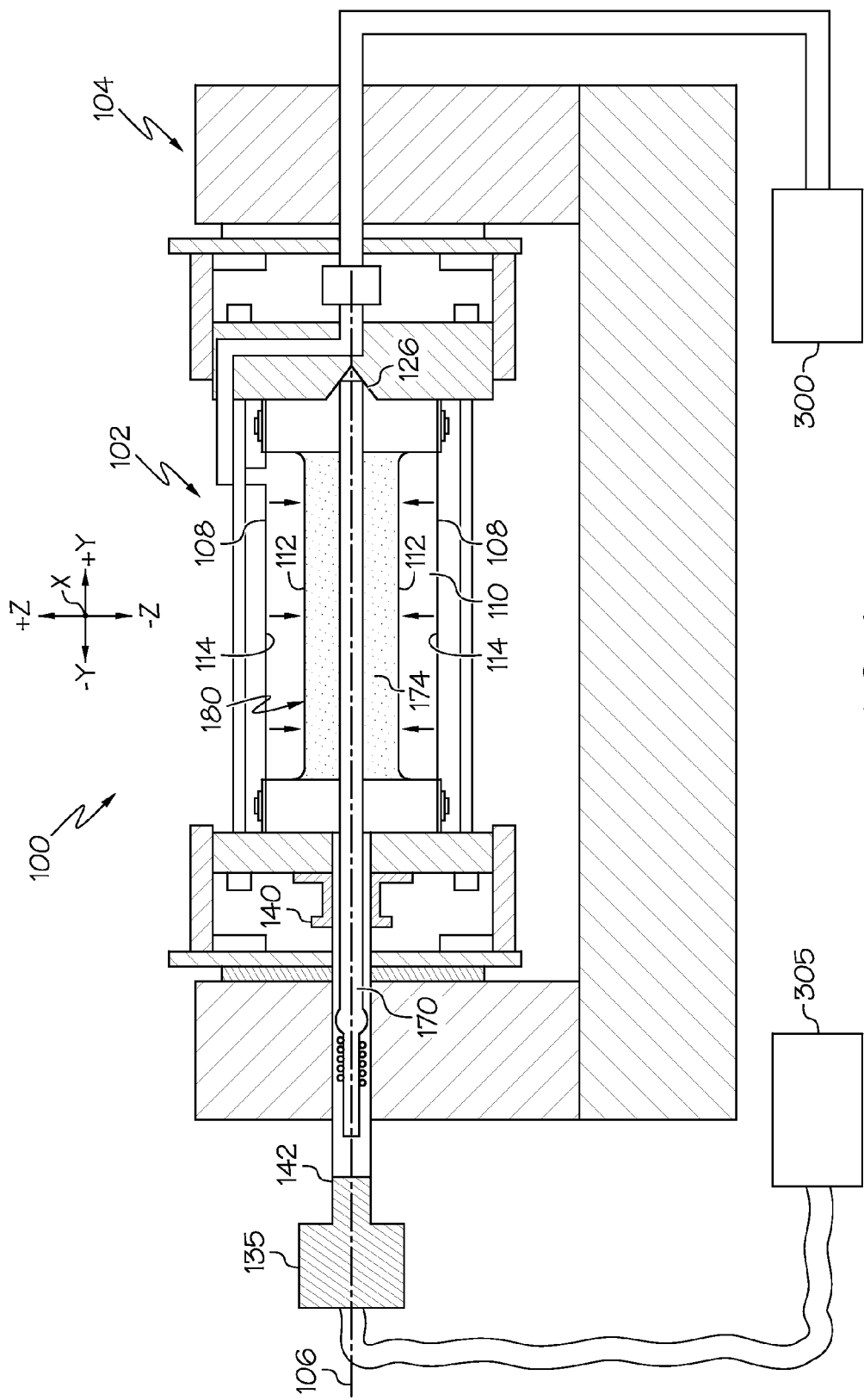
FIG. 5 schematically depicts a cross section of the soot pressing apparatus of FIG. 1 with silica glass soot in the mold cavity as the mold is being rotated and the soot is being compressed radially inward.

Referring now to FIG. 5, as the mold 102 is rotated with the rotary device 104, a compression fluid, such as air, compressed gas, or the like, is introduced into the mold cavity 110 between the inner wall 114 of the mold body and the elastically deformable bladder 112. The compression fluid is directed into the mold cavity from a fluid source coupled to the rotary union 134. As the compression fluid enters the mold cavity 110, the compression fluid acts on the elastically deformable bladder 112, displacing the elastically deformable bladder 112 radially inward which, simultaneously, compresses the silica glass soot in a radial inward direction, toward the glass core blank 170, thereby forming a preform soot compact layer 174 around the glass core blank 170.

In some embodiments described herein, the compression fluid may be introduced into the mold cavity 110 at a controlled ramp rate. For example, in one embodiment, the compression fluid may be introduced into the mold cavity such that the pressure in the mold cavity 110 between the inner wall 114 and the elastically deformable bladder 112 increases at a rate from about 1 psi/min (about 6 kPa/min) to about 10 psi/minute (about 60 kPa/min). In embodiments, the compression fluid may be introduced into the mold cavity 110 until the pressure in the mold cavity 110 between the inner wall 114 and the elastically deformable bladder 112 reaches a maximum value of less than or equal to about 200 psi (about 1.5 MPa). In some embodiments, the maximum pressure is sufficient to compress the silica glass soot to a density from about 0.5 g/cc to about 0.9 g/cc. While specific values for the maximum pressure and ramp rate have been described herein, it should be understood that other values are contemplated and that the specific pressure values (i.e., ramp rate and maximum pressure) are selected to achieve a specific density for each preform soot compact layer 174 formed around the glass core blank 170.

As the silica glass soot 172 is compressed around the glass core blank 170, air trapped in the silica glass soot 172 is forced out of the mold cavity through the stopper cushion 116 and the adapter tube 142. In some embodiments, vacuum pump 305 may be coupled to the adapter tube 142 with a rotary union 135, as described above. As the silica glass soot 172 is compressed, a vacuum is drawn on the adapter tube 142 to assist with the removal of air from the silica glass soot 172. However, because the elastically deformable bladder 112 separates and seals the interior of the elastically deformable bladder 12 (and the silica glass soot 172) from the inner wall 114 of the mold body 108, drawing a vacuum through the adapter tube 142 does not adversely impact the compression of the silica glass soot due to the introduction of compression fluid between the inner wall 114 of the mold body 102 and the elastically deformable bladder 112. Indeed, actively removing air from the silica glass soot 172 as the silica glass soot is compressed may actually expedite the compaction process.

Once the maximum pressure between the inner wall 114 and the elastically deformable bladder 112 has been reached, the pressure in the mold cavity and the rotational speed of the mold 102 are held constant for a predetermined dwell time to ensure that the silica glass soot is adequately compressed. Thereafter, the rotational speed of the mold 102 and the pressure in the mold cavity 110 are gradually decreased to ensure the integrity of the preform soot compact layer 174 formed around the glass core blank 170 which, collectively, form a preform compact assembly 180.

Figure 6:
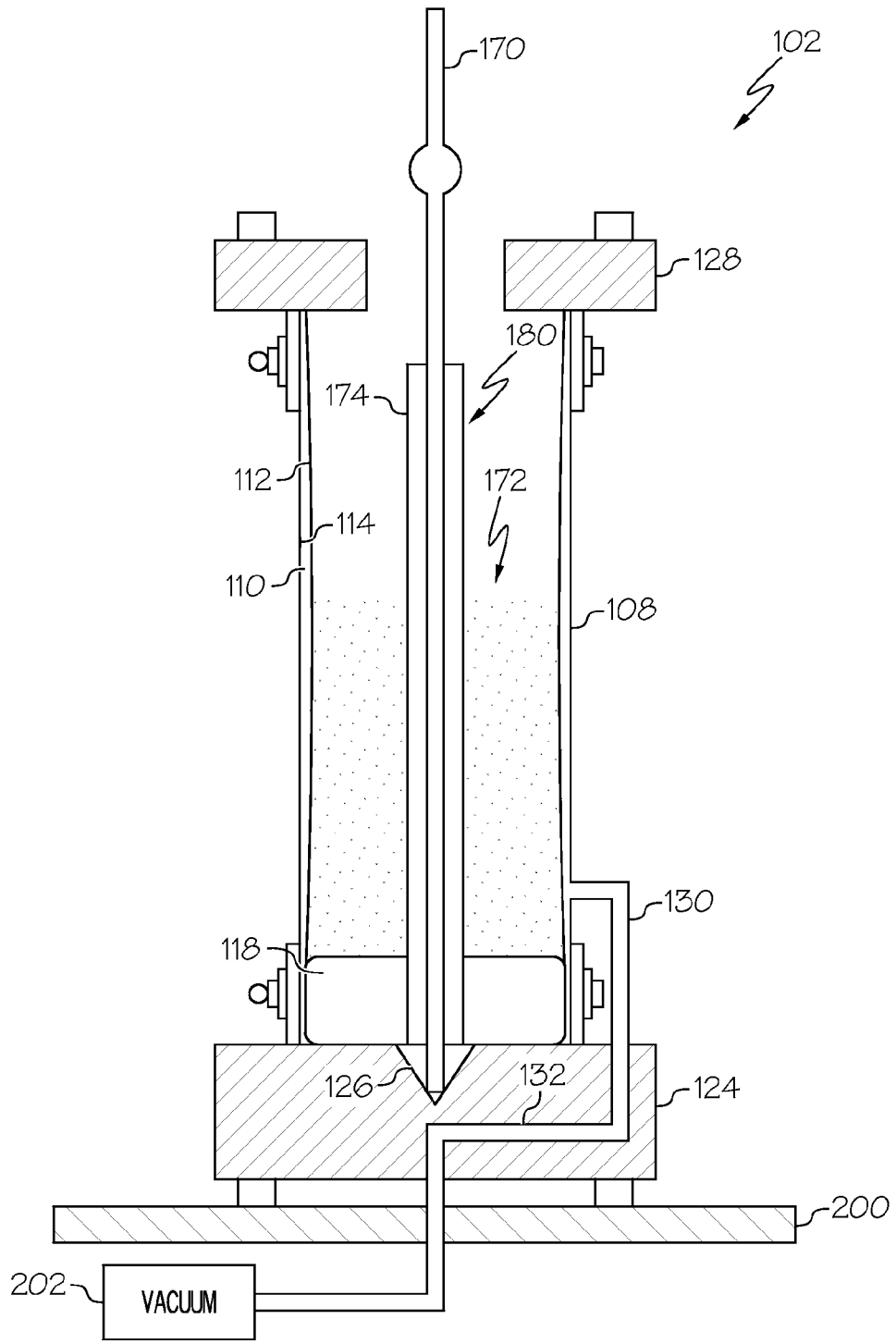
FIG. 6 schematically depicts a cross section of the mold of FIG. 2 as a second amount of silica glass soot is loaded around a preform compact assembly.

After the first preform soot compact layer 174 is formed around the glass core blank 170, one or more additional preform soot compact layers may be formed around the first preform soot compact layer 174 to achieve a specific refractive index profile in the preform compact assembly 180. Referring to FIG. 6 by way of example, after the first preform soot compact layer 174 is formed, the mold 102 is removed from the rotary device 104 and the adapter tube 142, adapter 140, and the at least one compression spring 143 are removed from around the glass core blank 170. Thereafter, a second amount of silica glass soot 176 is loaded into the mold cavity 110 in the elastically deformable bladder 112 and around the first preform soot compact layer 174. In some embodiments, the composition and/or morphology of the second amount of silica glass soot 176 may be the same as the first amount of silica glass soot forming the first preform soot compact layer 174. In some other embodiments, the composition and/or morphology of the second amount of silica glass soot 176 may be different than the first amount of silica glass soot forming the first preform soot compact layer 174. As described hereinabove, vibratory energy may be applied to the mold body 108 as the second amount of silica glass soot 176 is loaded into the mold cavity 110. Also, a vacuum may be optionally drawn on the mold cavity 110 through the fitting 130, as described above, to expand the elastically deformable bladder 112 radially outward, towards the inner wall of the mold cavity 110 as the second amount of silica glass soot 176 is loaded into the mold cavity 110.

Thereafter, the stopper cushion 116, adapter 140, at least one compression spring 143 and adapter tube 142 are reassembled around the glass core blank 170, as described above. The mold 102 is then reinserted in the rotary device 104, and the process of rotating the mold 102 as the silica glass soot is radially compressed is repeated to form a second preform soot compact layer around the first preform soot compact layer. This process (i.e., load silica glass soot, rotate mold while simultaneously compressing silica glass soot) may be repeated any number of times to achieve a preform compact assembly with the desired refractive index profile, soot layer thicknesses, and soot layer densities.

The resultant preform compact assembly comprising one or more preform soot compact layers formed around a glass core blank may then be consolidated to sinter the preform soot compact layers thereby forming a dense silica glass cladding portion around the glass core blank, thus producing an optical preform, such as an optical fiber preform. The consolidation of the preform soot compact layers also joins the cladding portion of the preform to the glass core blank 170 thereby forming an optical preform, such as an optical fiber preform.

In one embodiment, the preform compact assembly having one or more preform soot compact layers formed around a glass core blank may be consolidated to an optical fiber preform by affixing a handle to the glass core blank and hanging the preform soot compact assembly from a quartz immersion rod over a consolidation furnace. The consolidation furnace may generally comprise a tube furnace with a quartz muffle having a drying zone and a consolidation zone. The drying zone may be held at a temperature of about 1000° C. while the consolidation zone has a temperature gradient from about 1000° C. to about 1450° C. across the zone. The consolidation zone of the consolidation furnace may be maintained under a helium flow. The preform compact assembly is held in the drying zone of the consolidation furnace and successively exposed to a flow of helium and oxygen and a flow of helium and chlorine in two isothermal hold periods in order to dry the preform compact assembly and remove carbon, water and transition metal impurities. After the drying treatment, the atmosphere in the tube furnace is then switched to a helium flow and the preform compact assembly is lowered through the consolidation zone to increase the temperature of the silica glass soot creating a vitreous flow of glass sufficient to form fully consolidated glass.

While a conventional consolidation of the preform compact assembly has been described herein above, it should be understood that alternative consolidation processes are contemplated including, without limitation, low pressure consolidation.

Following consolidation, the consolidated preform compact assembly (now optical fiber preform) is withdrawn from the consolidation furnace and loaded into a 1000° C. holding oven for at least six hours to de-gas and anneal the preform. Thereafter, the optical fiber may be drawn from the preform.

EXAMPLES

The embodiments described herein will be further clarified by the following example.

Example 1

A preform compact assembly having a glass core blank surrounded by three soot compact layers was formed. The preform compact assembly was formed by positioning the glass core blank within the elastically deformable bladder of the mold apparatus as depicted in FIG. 2. The glass core blank consisted of a 12 mm diameter glass core blank with an additional layer of outside vapor deposited (OVD) silica such that the total diameter of the glass core blank was 57 mm. Approximately 150 grams of silica glass soot was poured into the elastically deformable bladder around the glass core blank.

To form the first soot compact layer around the glass core blank, the mold apparatus was then rotated at 115 RPM to distribute the silica glass soot evenly throughout the interior of the mold apparatus. As the mold apparatus was rotated, the elastically deformable bladder was compressed around the glass core blank by supplying compressed air to the mold apparatus between the interior wall of the mold cavity and the elastically deformable bladder, thereby compressing the silica glass soot around the glass core blank. The pressure applied to the elastically deformable bladder was ramped from 0 psi to 150 psi at a ramp rate of 5 psi/min. The maximum pressure was maintained for a hold period of 15 minutes. Thereafter, the pressure was decreased to 0 psi at a ramp rate of −10 psi/min.

The second and third soot compact layers were formed around the first soot compact layer using a similar process. Specifically, for each of the second and third soot compact layers, approximately 150 grams of silica glass soot was poured into the elastically deformable bladder around the previously formed soot compact layer. The mold apparatus was then rotated at approximately 75 RPM. Slower rotational speeds were used in the formation of the second and third soot compact layers to prevent damage to previously formed soot compact layers. As with the first soot compact layer, the second and third soot compact layers were formed by compressing the silica glass soot around the glass core blank by supplying compressed air to the mold apparatus between the interior wall of the mold cavity and the elastically deformable bladder, thereby compressing the silica glass soot around the glass core blank. The pressure applied to the elastically deformable bladder was ramped from 0 psi to 150 psi at a ramp rate of 5 psi/min. The maximum pressure was maintained for a hold period of 15 minutes. Thereafter, the pressure was decreased to 0 psi at a ramp rate of −10 psi/min.

The resulting preform compact assembly included a glass core blank with a diameter of 52 mm surrounded by three concentric soot compact layers formed from compressed silica glass soot. Each of the soot compact layers had a radial thickness of approximately 0.25 inches.

Based on the foregoing, it should now be understood that the methods and apparatuses described herein may be used to form an optical preform, such as an optical fiber preform, by compressing silica glass soot in a mold as the mold is rotated. The rotation of the mold allows the silica glass soot to be evenly distributed in the mold, thereby improving the uniformity of the resultant preform compact assembly and, ultimately, the optical preform formed from the preform compact assembly.

The methods and apparatuses described herein enable the formation of an optical preform from multiple layers of silica glass soot, wherein each consecutive layer is formed with silica glass soot having a different composition and/or morphology. This allows the optical preform to be constructed with a desired refractive index profile using consecutive soot pressing operations.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming an optical preform, the method comprising:
    loading silica glass soot in a mold cavity of a mold body;
    rotating the mold body at a rotational speed sufficient to force the silica glass soot towards an inner wall of the mold body; and
    compressing the silica glass soot in an inward radial direction as the mold body is rotated to form a soot compact layer.

2. The method of claim 1, further comprising orienting the mold body such that a long axis of the mold body is substantially horizontal prior to rotating the mold body, wherein the mold body is rotated about the long axis of the mold body.

3. The method of claim 1, further comprising drawing a vacuum on the mold cavity as the mold body is rotated.

4. The method of claim 1, further comprising positioning a glass core blank in the mold cavity prior to loading the silica glass soot in the mold cavity, wherein the silica glass soot is compressed in an inward radial direction around the glass core blank to form the soot compact layer.

5. The method of claim 1, wherein the mold body is rotated at a rotational speed from greater than or equal to about 50 RPM to less than or equal to about 500 RPM.

6. The method of claim 1, wherein the silica glass soot is compressed in the inward radial direction at a ramp rate from about 1 psi per minute to about 10 psi per minute.

7. The method of claim 1, wherein the silica glass soot is compressed with a maximum pressure less than or equal to 200 psi.

8. The method of claim 1, wherein the silica glass soot is compressed to a density from about 0.5 g/cc to about 0.9 g/cc.

9. The method of claim 1, wherein:
    the mold body comprises an elastically deformable bladder positioned in the mold cavity;
    the silica glass soot is loaded in the elastically deformable bladder; and
    the silica glass soot is compressed in an inward radial direction by applying pressure between the mold body and the elastically deformable bladder.

10. The method of claim 9, further comprising drawing a vacuum between the inner wall of the mold body and the elastically deformable bladder to expand the elastically deformable bladder as the silica glass soot is loaded into the elastically deformable bladder.

11. A method for forming an optical preform, the method comprising:
    loading a first amount of silica glass soot in a mold cavity of a mold body;
    rotating the mold body at a rotational speed sufficient to force the first amount of silica glass soot towards an inner wall of the mold body;
    compressing the first amount of silica glass soot in an inward radial direction as the mold body is rotated to form a first soot compact layer;
    loading a second amount of silica glass soot in the mold cavity of the mold body around the first soot compact layer;
    rotating the mold body at a rotational speed sufficient to force the second amount of silica glass towards the inner wall of the mold body; and
    compressing the second amount of silica glass soot in an inward radial direction as the mold body is rotated to form a second soot compact layer around the first soot compact layer.

12. The method of claim 11, wherein a composition of the first amount of silica glass soot is different than a composition of the second amount of silica glass soot.

13. The method of claim 11, wherein a morphology of the first amount of silica glass soot is different than a morphology of the second amount of silica glass soot.

14. The method of claim 11, further comprising positioning a glass core blank in the mold cavity prior to loading the first amount of silica glass soot in the mold cavity, wherein the first amount of silica glass soot is compressed in an inward radial direction around the glass core blank to form the first soot compact layer.

* * * * *